United States Patent
Boni

(10) Patent No.: US 10,972,137 B2
(45) Date of Patent: Apr. 6, 2021

(54) MULTIPROTOCOL MODULAR COMMUNICATION SYSTEM

(71) Applicant: REDOX S.R.L., Reggio Emilia (IT)

(72) Inventor: Angelo Boni, Reggio Emilia (IT)

(73) Assignee: REDOX S.R.L., Reggio Emilia (IT)

( * ) Notice: Subject to any disclaimer, the term of this patent is extended or adjusted under 35 U.S.C. 154(b) by 0 days.

(21) Appl. No.: 16/766,353

(22) PCT Filed: Nov. 22, 2018

(86) PCT No.: PCT/IB2018/059215
§ 371 (c)(1),
(2) Date: May 22, 2020

(87) PCT Pub. No.: WO2019/106497
PCT Pub. Date: Jun. 6, 2019

(65) Prior Publication Data
US 2020/0287573 A1    Sep. 10, 2020

(30) Foreign Application Priority Data
Nov. 28, 2017  (IT) .......... 102017000136170

(51) Int. Cl.
*H04B 1/00* (2006.01)
(52) U.S. Cl.
CPC ............... *H04B 1/0053* (2013.01)
(58) Field of Classification Search
CPC .... H04B 1/0053; H04B 1/006; H04B 1/0064; H04B 1/0067; H04B 1/04; H04B 1/16; H04B 1/40; H04B 1/401
See application file for complete search history.

(56) References Cited

U.S. PATENT DOCUMENTS

| | | | |
|---|---|---|---|
| 2006/0094393 A1 | 5/2006 | Okuyama et al. | |
| 2008/0238713 A1* | 10/2008 | Banhegyesi | G01R 22/065 340/870.02 |
| 2008/0285531 A1 | 11/2008 | Okuyama et al. | |
| 2012/0077541 A1* | 3/2012 | Wu | H04W 88/06 455/552.1 |
| 2014/0370804 A1* | 12/2014 | Dorning | H04B 5/0037 455/41.1 |
| 2016/0365878 A1 | 12/2016 | Balm et al. | |

FOREIGN PATENT DOCUMENTS

| | | |
|---|---|---|
| EP | 1655851 | 5/2006 |
| WO | 9203887 | 3/1992 |
| WO | 2015135588 | 9/2015 |

\* cited by examiner

*Primary Examiner* — Nguyen T Vo
(74) *Attorney, Agent, or Firm* — Pearne & Gordon LLP

(57) ABSTRACT

A multiprotocol modular communication system, comprising: a main circuit (1), provided with an antenna connector (5) for enabling connection of an antenna (4); two or more connectors (2, 2a, 2n), provided with a first pin (10) and a second pin (11) connectable to one another, wherein the first pin (10) of a first connector (2) is connected to the antenna connector (5) by means of a track (6); two or more communication boards (3), each operating with a determined communication protocol, each of which is insertable in a respective connector (2, 2a, 2n), wherein each communication board (3), if inserted in a connector (2, 2a, 2n), connects the first pin (10) and the second pin (11) of the connector. The connectors (2, 2a, 2n) are connected in series via band-pass filters (7, 8).

8 Claims, 3 Drawing Sheets

MULTIPROTOCOL MODULAR COMMUNICATION SYSTEM

The present invention relates to a multiprotocol modular communication system.

Today's communication systems can avail of a plurality of operating frequencies and various protocols, each developed for a particular class of needs. By way of example, Bluetooth, operating at 2.4 GHz, in its various versions is a very flexible protocol able to transmit data and audio at a distance of up to 1 Km, with low energy use and a data transfer rate of around 1-3 Mb. As for faster transfer rates, the WiFi protocol, operating at 2.4 and 5.7 GHz, is able to transfer data at 200 Mb and beyond, though with a considerably greater energy consumption. There also exists the "Wireless M Bus" protocol, prevalently operating at 169 MHz, for automatic meter reading (gas, water, electricity). The lower working frequency is able to easily pass through walls, guaranteeing continuation of service even in adverse conditions. The 868 MHz frequency has been a free band for some time, and is used by remote control units for appliances, audio transmissions and data for many uses. Radio modems operating on the mobile telephone network (800-900 MHz, 1800-2100 MHz bands) produce models with progressively greater data capacity (50-200 Mb). Further, a standard is under development, operating on the same infrastructures, which can transmit data at low-rate via the Internet of Things (IOT). This standard is becoming more established than other local standards, since, like mobile radio modems, it does not have a maximum working distance, typical of other systems, but has the same coverage as the mobile telephone network. This protocol (Narrow Band Internet of Things—NBIOT) is the one which at present is considered to be superior to all others, as a communication standard.

There exist electronic boards able to place these different radio protocols in communication, for all those uses where it is necessary to exchange data among various systems. The proximity of the various antennas, however, creates problems of incompatibility and mutual influence among the various systems, especially if each system has not been designed to be compatible with other systems located at a short distance from one another.

This reciprocal interference among different systems is the greatest issue occurring in IOT applications (Internet of Things), where close positioning of various electronic boards, each perfectly functional in itself, but unable of operating together with the others, causes instability and malfunctioning.

Up to now the remedy adopted consists in the use of individually screened and filtered modules, with the respective antennas located as far as possible from one another.

It is clear that in order to obtain a good functioning level there has been a growth in both volumes and costs of the whole system, while the IOT market requires modest costs and volumes that are as compact as possible in order to be able to install the system in already-defined spaces.

An aim of the present invention is to make the systems co-exist in a small space, to reduce as far as possible the number of antennas and reduce costs and dimensions.

A further aim is to realise a modular system able to accept from one to more modules, without any need to change the physical configuration of the basic system.

According to the invention, both the connection resources of the antennas and the exchange of data are realised in a modular way. The antenna will be constituted by a multiband or a broadband model, able to cover the bands of interest to the system. Should the system use two protocols sharing the same band (for example BT and WIFI at 2.4 GHz), it will be possible to insert a second antenna to decouple one of the two devices. Said antenna will be arranged at the point of minimum coupling between the two antennas. Said position will be verified by use of an electromagnetic simulator or by practical measurement of the interference between the two antennas.

Further characteristics and advantages of the present invention will become more apparent in the following detailed description of an embodiment of the present invention, illustrated by way of non-limiting example in the attached figures, wherein.

Figure 1:
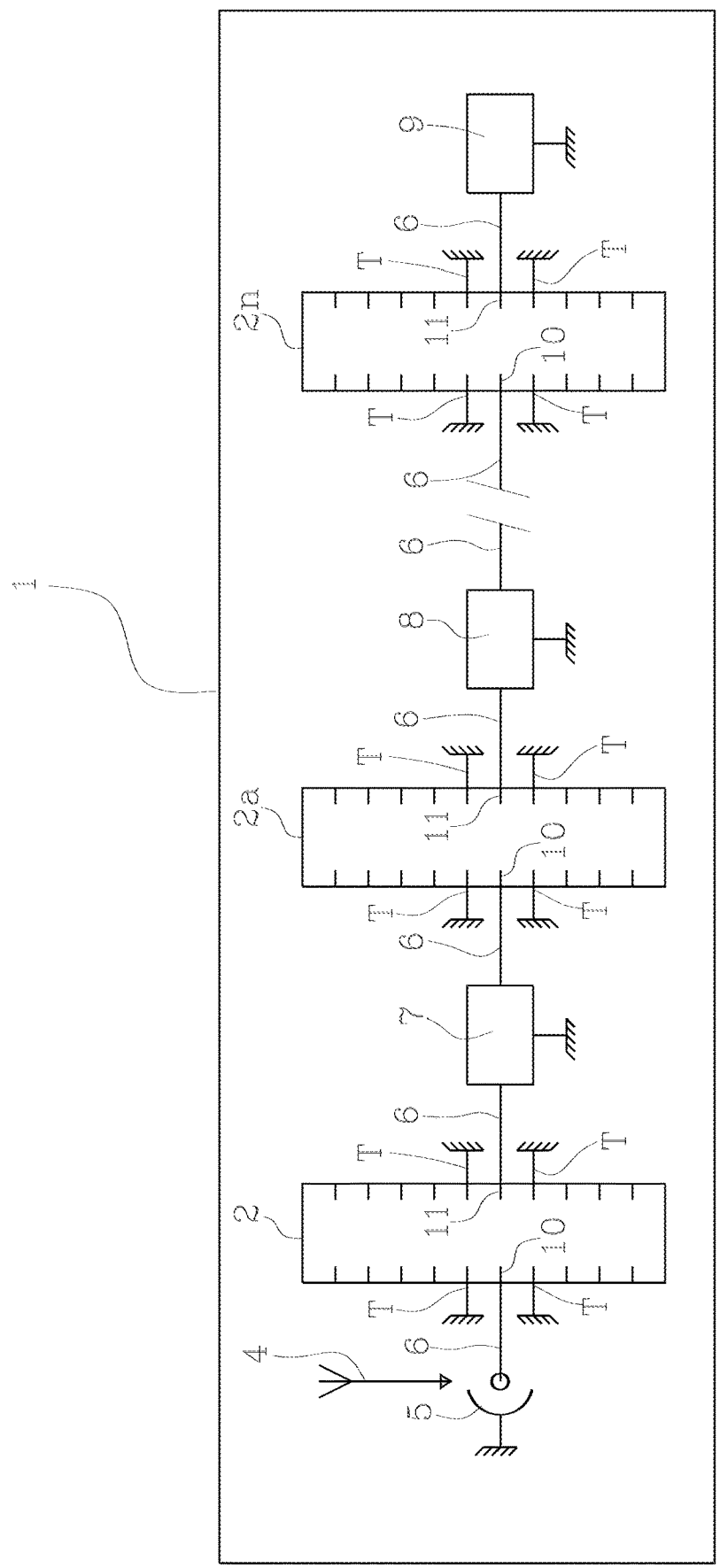
FIG. 1 is a schematic view of a multiprotocol modular communication system according to the present invention.

The multiprotocol modular communication system according to the present invention comprises a main circuit (1), for example a printed circuit, to which a plurality of connectors (2, 2a, 2n) are associated, for example in the form of slots. Each connector (2, 2a, 2n) is able to house a communication board (3), schematically represented in FIG. 2A, able to operate with a specific communication protocol, for example one from among those described in the preliminary part of the description, or similar protocols.

The system further comprises an antenna (4), connected to the main circuit (1) by means of an antenna connector (5), for example of a coaxial type. The antenna (4) is connected via the antenna connector (5) and a controlled impedance track (6) to a first pin (10) of a first connector (2) which, from among those present, is preferably, though not necessarily the nearest to the connector (5).

The successive connectors (2a, 2n) are connected in series to the first connector (2) and the antenna connector (5) by means of further tracks (6). The further tracks (6) are open at the connectors (2, 2a, 2n) and are closed at each connector by the relative communication board (3), when inserted in the connector.

A band-pass filter (7, 8) is interposed along the connection track (6) between each connector (2, 2a, 2n) and a following connector. The band-pass filter (7, 8) has an impedance which is such as to block the frequencies used by the communication board (3) inserted in the preceding connector (2, 2a, 2n), but not the frequencies used by the communication boards (3) inserted in the successive connectors (2a, 2n).

The first connector (2) comprises a second pin (11), preferably located in front of the first pin (10). The first and second pin (10, 11) can be connected to one another by a communication board (3), when the board (3) is inserted in the connector (2).

The second pin (11) of the first connector (2) is connected, by means of a second controlled impedance track (6), to a first pin (10) of a second connector (2a). The second connector (2a) in turn comprises a second pin (11), which can be connected to the first pin (10) via a second communication board (3), when the second communication board (3) is inserted in the second connector (2a). The second track (6) is provided with a band-pass filter (7). The band-pass filter (7) has an impedance which is such as to block the frequencies used by the communication board (3) inserted in the first connector (2), but not the frequencies used by the communication board (3) inserted in the successive connector (2a) and by all the boards (3) inserted in the successive connectors.

Further connectors (2) can be connected in series to the second connector (2a) in the above-described ways, by means of tracks (6) each of which is provided with a band-pass filter, up to a last connector (2n), connected to a termination impedance (9) by means of a track (6). In the illustrated diagram the track (6) in output from the second connector (2a) is provided with a band-pass filter (8).

The connectors (2, 2a, 2n) present are therefore connected in series to one another by means of tracks (6). A band-pass filter (7, 8) is interposed between a connector and the successive connector, the impedance of which is such as to block the frequencies used by the communication board (3) inserted in the preceding connector (2, 2a, 2n), and such as to allow the frequencies used by the communication boards (3) provided for the successive connectors (2a, 2n) to pass.

The band-pass filters (7, 8) and the termination impedance (9) are known components and will not be described in further detail.

In general terms, by inserting a communication board (3) in each connector (2), the contact between the first and the second pin (10, 11) of the connector (2) closes, enabling a connection of the antenna (4) to the communication board (3) and to the successive connector (2).

In the illustrated embodiment, by inserting a communication board (3) in the first connector (2) a connection of the antenna (4) to the second connector (2a) is enabled. By inserting a communication board (3) in the second connector (2a) a connection of the antenna (4) to the successive connector is enabled, and so on up to the final connector (2n), the residual output of which in radio frequency will possibly be terminated on the termination impedance (9), if necessary.

The communication system of the present invention therefore includes a segmentation of the connections between the various connectors (2, 2a, 2n) and the antenna (4), instead of a single controlled impedance track which connects all the connectors in parallel to the antenna, as occurs in systems of known type. This segmentation, obtained by distinct tracks (6) interposed among the various connectors (2, 2a, 2n), each provided with a band-pass filter (7, 8), enables preventing undesired interactions among the various boards (3) and malfunctioning of the invention.

In fact, a track crossed by various radio signals, not connected to a controlled impedance, generates selective reflections with the frequency (for example at ¼ of the wavelength), which are manifested on the material of the printed circuit, with a length in the order of a centimetre. The use of a segmented connection between the antenna (4) and the various connectors (2, 2a, 2n) enables preventing these reflections.

A further advantage linked to the use of a segmented connection between the antenna (4) and the various connectors (2, 2a, 2n) is the best matching of each board (3) to the line impedance, which can remain constant and identical to the characteristic impedance thereof. The band-pass filters (7, 8) and the terminal impedance (9) can be configured to equalise and make the impedance constant on each connector (2) and on the tracks (6).

The illustrated embodiment includes a single antenna (4). It is possible for more antennas to be provided ("antenna diversity", MIMO—multiple inputs, multiple output), and in this case the main circuit (1) is provided with a plurality of antenna connectors (5), one per antenna. Each antenna connector (5) is connected to the connectors (2, 2a, 2n) via respective tracks (6), structured in the above-described way, i.e. provided with band-pass filters (7, 8) and a terminal impedance (9). Each connector is also provided with further pairs of pins, connected in series to the various tracks (6), in order to enable series connection of the connectors (2, 2a, 2n) to the various antennas. In other terms, the line formed by the various tracks (6), by the first and second pin (10, 11) of each connector (2, 2a, 2n) and by the band-pass filters (7, 8), can be replicated for each antenna connector (5) present, using pairs of pins of each connector (2, 2a, 2n) that are different to the pair formed by the first and second pin (10, 11).

Each communication board (3) comprises a radio circuit (14), connectable to the pins (10, 11) of the connector (2). Each communication board (3) further comprises a band-splitting filter (12), with a constant impedance, interposed between the pins (10, 11) and the radio circuit (14).

Figure 2:
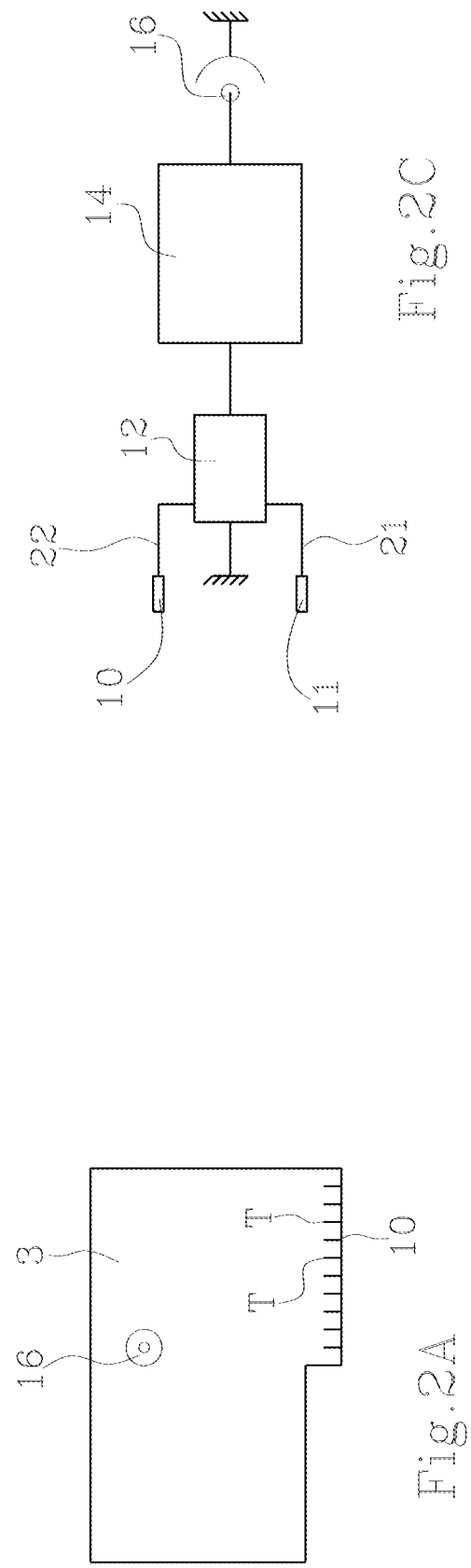
FIG. 2A is a schematic view of a component of the communication system according to the present invention.
FIG. 2B is a schematic view of a further component of the communication system according to the present invention.
FIG. 2C is a schematic view of the component of FIG. 2B, in an alternative embodiment.
Figure 3:
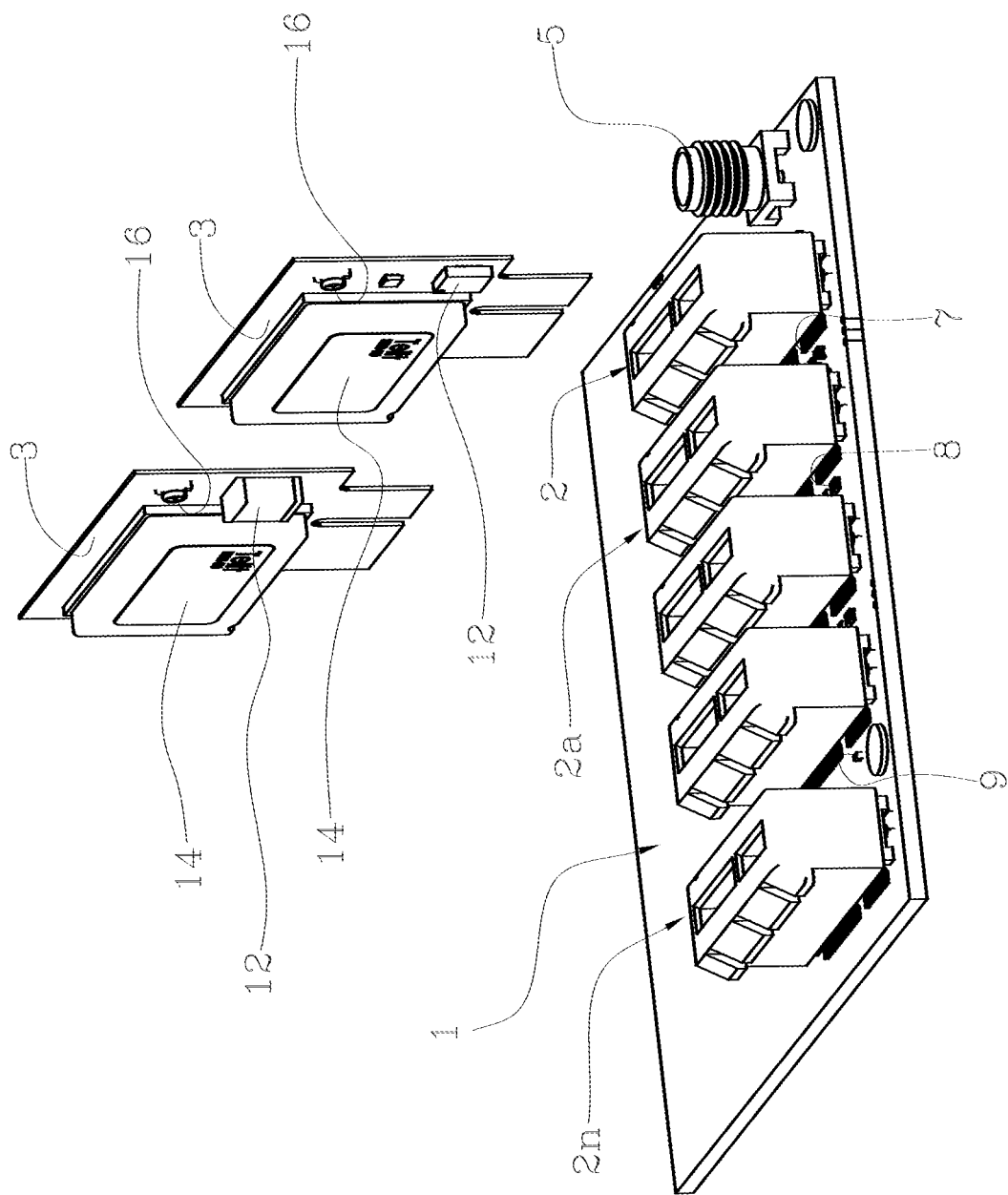
FIG. 3 is an isometric schematic view of the communication system according to the present invention.

In a first embodiment, illustrated in FIG. 2B, the pins (10, 11) are directly connected to one another at a connection (20). The band-splitting filter (12) is interposed between the connection (20) and the radio circuit (14) and places in input thereto only the frequencies necessary for functioning thereof, while all the other frequencies are sent to the successive connectors (2) or to the terminal impedance (9).

In a second embodiment, illustrated in FIG. 2C, the band-splitting filter (12) is interposed between the pins (10, 11) and the radio circuit (22, 21). The band-splitting filter (12) sends to the radio circuit (14) all the frequencies useful for the functioning thereof, while all the other frequencies are sent to the second pin (11) in order to be sent on to the successive connectors (2) or to the terminal impedance (9).

The use of the band-splitting filter (12) enables preventing any perturbation of the impedance of the tracks (6).

The band-splitting filter (12) is a known component in the sector and in the technical literature, and will therefore not be described in further detail.

Each communication board (3) can be provided with an independent antenna, connectable by means of an antenna connection (16). In this case, the communication board (3) does not need the signal coming from the antenna (4). The band-splitting filter (12) is switchable between two impedance values: a first impedance value is such as to filter the frequencies normally used by the communication board (3); a second impedance value is such as not to filter the frequencies normally used by the communication board (3), leaving the frequencies available to the tracks (6). If the board is connected to an independent antenna, the band-splitting filter (12) is configured in the second impedance value.

Each connector (2) is illustrated with further pins, as well as the first and second pin (10, 11) used for connecting the antenna (4) to the radio circuits (14) and to the successive connectors. The further pins, illustrated without any connection, are in reality used for electrically powering the communication boards (3) and for data connections between the communication boards (3) and a data processing module, not illustrated. These connections are of known type and are therefore not described in further detail, nor illustrated in the figures. The data exchanged between the communication boards (3) and the data processing module can be used, in a known way, for controlling and activating the various devices, for example for the switching on/off of lighting plants, for sending/receiving audio or other signals.

The position of the first and the second pin (10, 11) of each connector (2) is not necessarily the one illustrated in the figures, but can be chosen in relation to the conformation and arrangement of the connectors (2). In the diagram of FIG. 1, the connectors (2) have an elongate rectangular shape and the pins are arranged along two parallel and flanked rows. If the connectors (2) are arranged as shown in figure, i.e. neared and parallel to one another, and are orientated perpendicularly to the tracks (6), the illustrated position of the pins (10, 11) is particularly advantageous, as it enables containing the length of the tracks (6) and maintaining the tracks (6) straight. If, for example, the connectors were arranged in longitudinal alignment, the first and the second pin (10, 11) might be located at the ends of the connector (2).

Two or more pins (T) can be arranged at the sides of the first and second pin (10, 11), connected to the system earth, so as to maintain the impedance of the connection constant also through the connector (2).

The invention claimed is:

1. A multiprotocol modular communication system, comprising:
    a main circuit (1), provided with an antenna connector (5) for enabling connection of an antenna (4);
    two or more connectors (2, 2a, 2n), provided with a first pin (10) and a second pin (11) connectable to one another, wherein the first pin (10) of a first connector (2) is connected to the antenna connector (5) by means of a track (6);
    one or more communication boards (3), each operating with a determined communication protocol, each of which is insertable in a respective connector (2, 2a, 2n), wherein each communication board (3), if inserted in a connector (2, 2a, 2n), connects the first pin (10) and the second pin (11) of the connector;
    characterised in that: the second pin (11) of each connector (2, 2a, 2n) is connected to the first pin (10) of a successive connector by means of a track (6) provided with a band-pass filter (7, 8); each band-pass filter (7, 8) has an impedance which is such as to block the frequencies used by the communication board (3) inserted in the preceding connector (2, 2a, 2n).

2. The communication system according to claim 1, wherein each connector (2, 2a, 2n) is provided with two or more further pins (T) earth connected and arranged in proximity of the first and the second pin (10, 11).

3. The communication system according to claim 1, wherein:
    at least one communication board (3) comprises a radio circuit (14), connectable to the pins (10, 11) of a respective connector (2, 2a, 2n), and a band-splitting filter (12), interposed between the pins (10, 11) and the radio circuit (14);
    the pins (10, 11) are directly connected to one another at a connection (20);
    the band-splitting filter (12) is interposed between the connection (20) and the radio circuit (14).

4. The communication system according to claim 3, wherein: at least one communication board (3) is provided with an antenna connection (16) for enabling connection of an independent antenna;
    the band-splitting filter (12) is switchable between two impedance values: a first impedance value is such as to filter the frequencies normally used by the communication board (3); a second impedance value is such as to not filter the frequencies normally used by the communication board (3), leaving the frequencies available to the tracks (6);
    if the board is connected to an independent antenna, the band-splitting filter (12) is predisposed to be configured in the second impedance value.

5. The communication system according to claim 1, wherein:
    at least a communication board (3) comprises a radio circuit (14), connectable to the pins (10, 11) of a respective connector (2, 2a, 2n), and a band-splitting filter (12), interposed between the pins (10, 11) and the radio circuit (14);
    the band-splitting filter (12) is interposed between the pins (10, 11) through respective connections (22, 21).

6. The communication system according to claim 5, wherein: at least one communication board (3) is provided with an antenna connection (16) for enabling connection of an independent antenna;
    the band-splitting filter (12) is switchable between two impedance values: a first impedance value is such as to filter the frequencies normally used by the communication board (3); a second impedance value is such as to not filter the frequencies normally used by the communication board (3), leaving the frequencies available to the tracks (6);
    if the board is connected to an independent antenna, the band-splitting filter (12) is predisposed to be configured in the second impedance value.

7. The communication system according to claim 1, wherein: the main circuit (1) is provided with a plurality of antenna connectors (5), each predisposed for connection to an antenna; each antenna connector (5) is connected to the connectors (2, 2a, 2n) via respective tracks (6), provided with band-pass filters (7, 8) and a terminal impedance (9).

8. The communication system according to claim 1, wherein each connector (2, 2a, 2n) comprises further pins, predisposed for electrically powering the communication boards (3) and for data connection between the communication boards (3) and a data processing module.

* * * * *